United States Patent Office 3,376,961
Patented Apr. 9, 1968

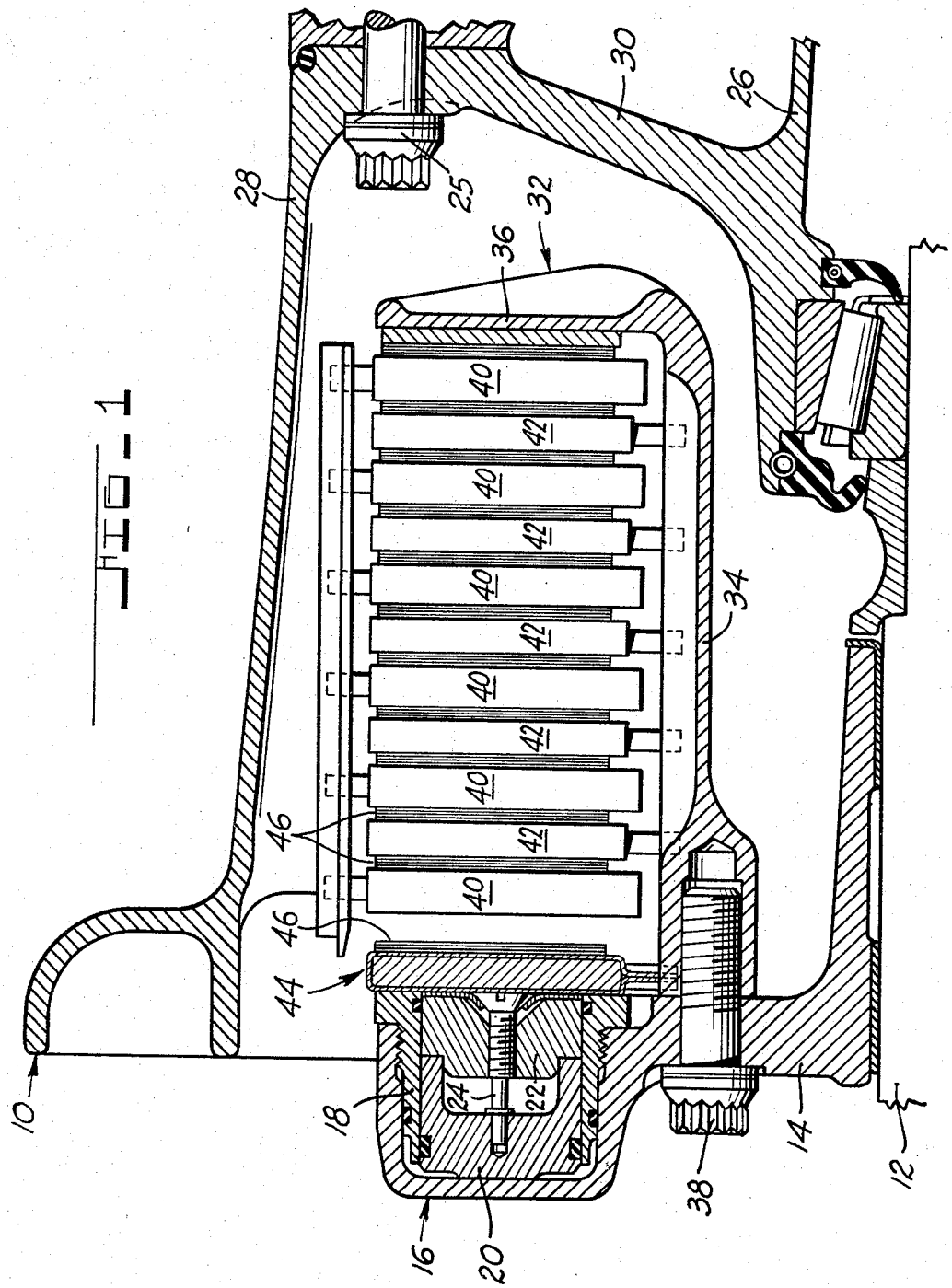

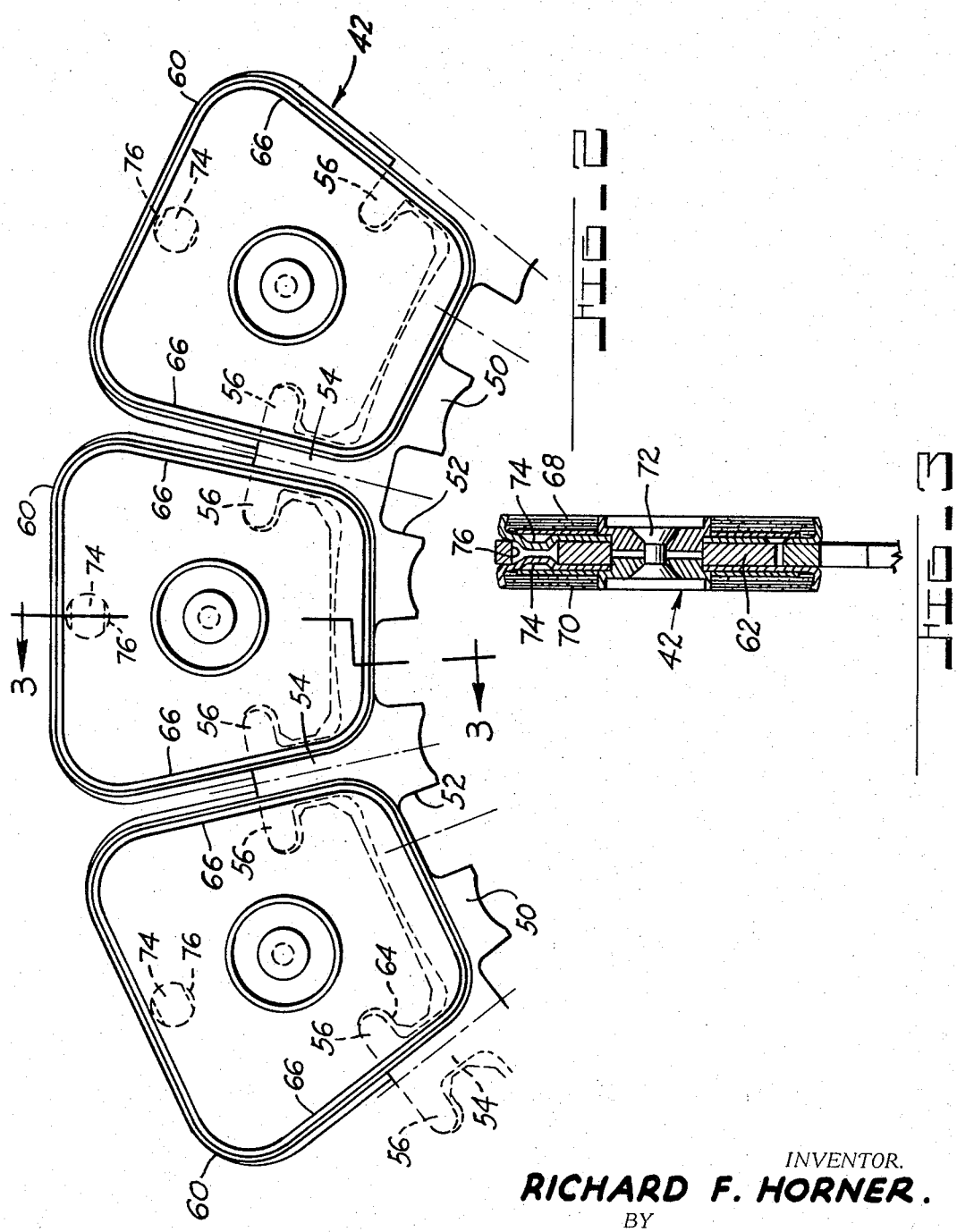

3,376,961
DISC BRAKE STATOR CONSTRUCTION
Richard F. Horner, South Bend, Ind., assignor to The Bendix Corporation, a corporation of Delaware
Filed Sept. 6, 1966, Ser. No. 577,410
3 Claims. (Cl. 188—218)

ABSTRACT OF THE DISCLOSURE

A stator disc element which includes an annular support member having a plurality of circumferentially spaced radially extending retention fingers, each of which has a pair of tongues extending therefrom, and a plurality of circumferentially arranged brake disc segments, each of which comprises an inner plate having a groove along each radial edge thereof for receiving one of the tongues, wherein the annular support member, the fingers extending therefrom, and the plate are all confined between a pair of friction pads which are riveted to the plate.

---

The high temperatures which are developed in aircraft brakes are, as a general rule, of such magnitude as to cause damage to many of the component parts. In this connection, it has been found that most current stator plate designs exhibit shrinkage and distortion as a result of many cycles of rapid heating and cooling.

Accordingly, it is an object of this invention to provide a unique disc stator construction which reduces the tendency of stators to shrink and become distorted.

Another object of this invention is to provide a stator construction which has a relatively long life and, as a consequence, is more economical to use.

A further object of this invention is to provide a stator construction of the segmented type wherein the segments thereof are uniquely retained in position by a keyed ring having radially extending fingers which engage the segments and by the brake lining pads of the segments which confine the keyed ring and radially extending fingers therebetween.

More specifically, it is an object of this invention to provide a unique stator construction which includes an annular support member having a plurality of circumferentially spaced radially extending retention fingers, each of which has a pair of tongues extending therefrom, and a plurality of circumferentially arranged brake disc segments, each of which comprises an inner plate having a groove along each radial edge thereof for receiving one of the tongues, wherein the annular support member, the fingers extending therefrom, and the plate are all confined between a pair of friction pads which are riveted to the plate.

A still further object of this invention is to provide a stator construction of the type described wherein the plate may be formed of beryllium.

The above and other objects and features of the invention will become apparent from the following description taken in connection with the accompanying drawings which form a part of this disclosure and in which:

FIGURE 1 is a sectional view of a portion of a symmetrical wheel and brake assembly which incorporates the invention;

FIGURE 2 is a side elevation of a portion of a symmetrical stator removed from the brake assembly of FIGURE 1; and FIGURE 3 is a sectional view taken along line 3—3 of FIGURE 2.

Referring to FIGURE 1, it will be seen that the wheel and brake assembly, which is illustrated, includes a wheel 10 rotatably mounted on a stationary axle 12 and a stationary carrier member 14 which is connected to the axle through any suitable means, such as by a direct bolt connection (not shown). The construction for rotatably mounting the wheel 10 to axle 12 and fixing the stationary carrier member 14 to the axle 12 is well known and a detailed description thereof is not deemed to be necessary. The carrier contains a plurality of fluid motor 16 each of which includes a protective sleeve 18 threadedly secured to said carrier and a piston 20 located and slidable in said sleeve. A block of insulating material 22 is secured to the head end of the piston by a threaded pin 24 for protecting the hydraulic brake fluid from the heat generated during braking. The wheel 10, which is formed of two sections fastened together by a plurality of bolts 24, includes a hub portion 26 and a rim portion 28 interconnected by a plurality of spokes 30. A torque tube 32 which includes a sleeve 34 and an annular backing plate flange 36 is fixedly secured to the carrier member 14 by a plurality of circumferentially spaced bolts 38.

The brake, which is illustrated, is of the disc type and includes a plurality of interleaved rotors 40 which are splined to and are rotated by the aircraft wheel 10 and includes stators 42 which are splined to sleeve 34 of the torque tube 32. The specific novel construction of the stators will be described hereafter. Both the rotors and stators are movable axially and are sometimes referred to as a brake "stack". It is the frictional engagement of these relatively rotatable rotors and stators which produces the desired braking action on the aircraft wheel. A pressure plate 44, which is suitably attached to the fluid motor 16, forces the rotors 40 and stators 42 against each other upon actuation of the motors by thrusting at one side of the stack and biasing the entire stack against the backing plate 36. Pressure plate 44, each of the stators 42 and the backing plate have friction material lining 46 provided thereon.

Referring to FIGURES 2 and 3, which show the novel detailed construction of each of the stators 42, it will be seen that each stator is comprised of an annular nonrotatable ring type support member 50 having a plurality of key slots or notches 52 on the inner periphery thereof which slidably engage axially extending keys preferably formed as integral parts of the torque absorbing member 34. In addition, the annular support member is formed with a plurality of circumferentially spaced radially extending retention fingers 54 each of which has a pair of circumferentially directed tongues 56 extending therefrom. Operatively connected to the annular support member are a plurality of circumferentially arranged brake disc segments 60 each of which includes an inner plate 62 having a groove 64 along each radial edge 66 thereof for receiving one of the tongues 56 of the retention fingers. In order to maintain the segments in the proper position with respect to the annular support member, a pair of friction pads 68 and 70 are suitably attached to the plate 62 by rivets 72 so that a portion of the friction pads extends over the ring portion of the annular support member and the radially extending retention fingers to, in effect, confine them between the friction pads. In order to prevent rotation of the friction pads 68 and 70 with respect to the plate 62, each of the pads is formed with an indentation 74 which is received in a recess 76 located in the plate.

Thus, by utilizing this type of unique construction, it is possible to fabricate a stator for use in aircraft disc brake which allows for a maximum amount of thermal expansion without shrinkage or distortion therein, and results in a longer lived stator than those presently being used on aircraft. Furthermore, this particular type of construction can incorporate the many advantages of beryllium as a heat sink material without being penalized for certain inherent disadvantages of this material. Thus, it is possible to form the plate 62 of beryllium since the beryllium is protected from forming a toxic oxide which is hazardous to human beings.

The several advantages which flow from this invention are believed to be obvious from the above description and other advantages may suggest themselves to those who are familiar with the art to which the invention relates.

Furthermore, although this invention has been described in connection with a specific embodiment, it will be obvious to those skilled in the art that various changes may be made in the form, structure and arrangement of parts without departing from the spirit of the invention. Accordingly, I do not desire to be limited to the specific embodiment disclosed herein primarily for purposes of illustration, but instead desire protection falling within the scope of the appended claims.

Having thus described the various features of the invention what I claim as new and desire to secure by Letters Patent is:

1. In a wheel and brake assembly having a rotatable wheel, a non-rotatable torque-absorbing member cooperatively associated with said wheel, and a plurality of axially movable rotor disc elements carried by said wheel, a plurality of stator disc elements interleaved with said rotor elements for frictional engagement therewith and supported on said torque-absorbing member, each of said stator elements comprising an annular non-rotatable support member adapted to be mounted on said torque-absorbing member of axial movement thereon, said support member including a plurality of circumferentially spaced radially extending retention fingers having radially directed sides, each of which has a pair of circumferentially directed tongues extending from said sides, and a plurality of circumferentially arranged brake disc segments having radially directed edges with a circumferentially directed groove in each radial edge spaced between the ends of said edges for receiving one of said tongues.

2. The structure, as defined in claim 1, wherein each brake disc segment comprises an inner plate having said groove in each radial edge thereof for receiving one of said tongues, and a pair of friction pads fixedly connected to the opposite sides of said plate.

3. The structure, as defined in claim 2, wherein said annular support member and said retention fingers extending therefrom, are confined between said friction pads, and said friction pads are held together and in position with respect to said annular support member by rivet means extending through said plate and pads.

References Cited

UNITED STATES PATENTS

| | | | |
|---|---|---|---|
| 2,893,519 | 7/1959 | Martin | 188—218 XR |
| 2,986,252 | 5/1961 | DuBois | 188—218 XR |
| 3,194,347 | 7/1965 | Hall | 188—218 XR |
| 3,306,401 | 2/1967 | Dasse | 188—251 |

MILTON BUCHLER, *Primary Examiner.*

GEORGE E. HALVOSA, *Examiner.*